(12) United States Patent
Bertocchi

(10) Patent No.: US 9,314,821 B2
(45) Date of Patent: Apr. 19, 2016

(54) METHOD FOR WASHING A SIEVE OF ROTATING MACHINES FOR EXTRACTING JUICE AND PUREE FROM VEGETABLE FOOD

(75) Inventor: Primo Bertocchi, Parma (IT)

(73) Assignees: Alessandro Bertocchi, Parma (IT); Laura Bertocchi, Pontremoli (MS) (IT); Rina Alice Gina Bertocchi, Milan (MI) (IT)

( * ) Notice: Subject to any disclaimer, the term of this patent is extended or adjusted under 35 U.S.C. 154(b) by 1210 days.

(21) Appl. No.: 11/568,458

(22) PCT Filed: May 23, 2005

(86) PCT No.: PCT/IB2005/001397
§ 371 (c)(1),
(2), (4) Date: Nov. 21, 2006

(87) PCT Pub. No.: WO2005/113166
PCT Pub. Date: Dec. 1, 2005

(65) Prior Publication Data
US 2008/0000500 A1  Jan. 3, 2008

(30) Foreign Application Priority Data

May 21, 2004 (IT) ................. PI2004A0035

(51) Int. Cl.
*B07B 1/20* (2006.01)
*B30B 9/12* (2006.01)
*A23N 1/00* (2006.01)
(52) U.S. Cl.
CPC . *B07B 1/20* (2013.01); *A23N 1/003* (2013.01); *B30B 9/12* (2013.01)

(58) Field of Classification Search
CPC ............ B30B 9/12; A23N 1/003; A23N 1/00; A23L 2/04; A23L 2/06
USPC ............ 99/513, 511, 510, 495; 100/111, 127, 100/145, 37; 366/196, 311, 331; 426/489, 426/495; 210/767, 787
See application file for complete search history.

(56) References Cited

U.S. PATENT DOCUMENTS 2,925,180 A  *  2/1960  Geiger ........................ 210/374
3,123,114 A     3/1964  Andrews et al.
(Continued)

FOREIGN PATENT DOCUMENTS

DE    3503043    7/1986
FR    2499876    8/1982
(Continued)

*Primary Examiner* — Reginald L Alexander
(74) *Attorney, Agent, or Firm* — Ladas & Parry LLP

(57) ABSTRACT

Machine (1) used in plants for making puree or fruit juice starting from vegetable or animal food, such as a rough extractor or a fine extractor, comprising a cylindrical body (2) having an inlet (3) for the product to treat, an outlet (4) for part of product that can be used and an outlet (5) for part of product to dispose of. The product put in the cylindrical body (2) of the machine (1) is pushed by centrifugal force of a plurality of blades of an armature (6) to pass through a sieve (7) having holes (8) and having a cylindrical or conic shape. The armature (6) is wheeled by a motor through a shaft (15). The machine (1) has a plurality of holes or nozzles (11) suitable for supplying in the sieve (7) a flow of washing liquid, for example water or diluted juice, in longitudinal direction, or radial direction, with respect to the machine (1), so that the blades of the armature in quick rotation forced it by centrifugal force against the inner surface of the sieve.

8 Claims, 2 Drawing Sheets

(56) References Cited

U.S. PATENT DOCUMENTS

| | | | | |
|---|---|---|---|---|
| 4,282,101 | A | * | 8/1981 | Takacs et al. ................. 210/403 |
| 4,518,621 | A | * | 5/1985 | Alexander .................... 426/495 |
| 4,768,425 | A | * | 9/1988 | Bonifacino .................... 99/352 |
| 5,386,765 | A | * | 2/1995 | Olusczak et al. ............... 99/486 |
| 5,632,907 | A | * | 5/1997 | Norbury ........................ 210/787 |
| 5,651,305 | A | * | 7/1997 | Bushman et al. ............... 99/510 |
| 5,662,035 | A | * | 9/1997 | Lee ............................... 100/112 |
| 6,668,710 | B2 | * | 12/2003 | Catelli et al. .................... 99/513 |

FOREIGN PATENT DOCUMENTS

| | | |
|---|---|---|
| GB | 1535478 | 12/1978 |
| WO | 91/08059 | 6/1991 |

\* cited by examiner

METHOD FOR WASHING A SIEVE OF ROTATING MACHINES FOR EXTRACTING JUICE AND PUREE FROM VEGETABLE FOOD

FIELD OF THE INVENTION

The present invention relates to machines for the food industry, and in particular it relates to a method for washing a sieve of machines used in plants for making puree or juice from vegetable or animal food, such as rough and fine extractors.

Furthermore, the invention relates to a machine that carries out this method.

BACKGROUND OF THE INVENTION

As well known, the industrial extraction of juice and puree from vegetable food—fruit and vegetables—executed by means of rotating machines, such as rough and fine extractors, is carried out squeezing a normally cut or chopped food through a perforated sheet or sieve. This sieve has cylindrical or conic shape and separates the parts of food to use, i.e. the product, from parts to be refused.

The energy necessary for the extraction is supplied by a driven impeller, or armature, which brings into rotation the chopped food within the sieve causing it to pass through the sieve by centrifugal force. The higher is the speed, the higher is the centrifugal force available for extraction of the puree through the holes of the sieve. The efficiency of the machine, for each type of starting food, is given by the ratio between the part of food that can pass outwards through the sieve, and the part that cannot pass through the sieve after having run across it for all its length, at the end of which it is disposed of.

Under equal conditions, the efficiency of extraction increases normally with the speed. However, after a certain time of operation of the machine, a thick layer, substantially consisting of puree that obstructs partially or totally the holes thereof, coats the outer surface of the sieve. This phenomenon, for most of food, is negligible in a first portion of the extraction surface of the sieve, and tends to increase gradually towards the final portion; in fact the juice is substantially a liquid and easily passes through the first portion of the sieve, whereas the puree, being thicker, encounters higher resistance to pass through the holes, and sticks on the external surface of the sieve owing to its viscosity. Therefore, the puree only partially leaves the outer surface of the sieve and obstructs the holes, causing a reduction of the efficiency of the machine.

Therefore, it is periodically necessary to remove the layer of thickened puree from the outer surface of the sieve for returning to a full extracting efficiency of the machine.

Solutions to this problem have been studied embodied in various devices, normally mechanical or hydraulic.

The former are scrapers or brushes having rotational or axial movement with respect to the sieve, so that they can raise the thick layer for detaching it and causing it to drop. The latter provide nozzles or sprayers emitting jets of washing liquid (mostly water) against the thickened layer, causing it to drop and clearing the outer surface of the sieve.

A feature common to the known systems is that they operate outside the sieve: this causes the cleaning forces, that are necessary for clearing the thick layer of deposited puree, to be directed from the outside towards the inside of the sieve, i.e. opposite to the puree flow, which is directed outwards.

This fact limits substantially the efficiency of these systems because the thickest parts of puree remain in the holes, especially in case of fine sieves, and hardens further within them.

Furthermore, in the systems using a washing liquid, strong jets of water must be used, with also a large quantity of water up to hundreds of liters, which adds to the juice or the puree causing an undesired dilution thereof.

SUMMARY OF THE INVENTION

It is therefore a feature of the invention to provide a method for washing a sieve of machines used in plants for making puree or juice, such as rough and fine extractors, that allows overcoming the above described drawbacks of the devices of prior art.

It is another feature of the invention to provide such a method for maintaining a perfect efficiency of the sieve of the machine without causing an excessive dilution to the product so that a full efficiency is obtained for all the operative time of the machine.

It is another object of the method to keep the sieve clean and effective with continuity and without stopping the machine for cleaning it.

It is a further feature of the invention to provide a machine capable of carrying out this method.

These and other features are accomplished with one exemplary method for washing a sieve in machines used in plants for making puree or juice, such as rough and fine extractors, comprising a rotating rotor having a plurality of blades suitable for causing the food by centrifugal force to pass through the sieve, whose main feature is to provide the step of introducing a measured amount of washing liquid in the sieve during operation of the machine, the measured amount of washing liquid being pushed outwards through the surface of the sieve by the centrifugal force of the rotating rotor of the machine.

It is apparent that it is completely irrelevant the way with which the washing liquid is put in the sieve, since it is the rotation of the rotor that provides all the energy necessary for washing the holes of the sieve and for cleaning a thin layer of puree adhering to the external surface of the sieve.

In particular, the above described amount of washing liquid put into the sieve is pushed from the inside by the centrifugal force of the armature of the machine, through the holes of the sieve and against the layer of puree adhering to the external surface of the sieve thus cleaning the sieve. Therefore, the supplied washing liquid from the inside reduces the grip between the stuck layer of puree and the external surface of the sieve, assisting its disengagement and its entrainment by the flowing temporarily diluted puree, avoiding then any obstruction of the holes of the sieve. In other words, the washing liquid put in the sieve infiltrates between the external surface of the sieve and the layer of puree causing it to drop and avoiding any obstruction of the holes of the sieve.

According to another aspect of the invention, a machine for making puree or juice, from vegetable or animal food, of the type comprising a rotating armature having a plurality of blades suitable for causing the food by centrifugal force to pass through a sieve, provides means for feeding a washing liquid in the sieve during a washing operation of the sieve.

In a possible exemplary embodiment of the invention, the feeding means that introduce the washing liquid in the sieve is a fixed part of the machine, i.e. it is integral to a fixed part to the machine.

The exemplary machine shown in FIGS. 1 and 2 belongs to this type.

Another exemplary embodiment provides introducing the washing liquid through a distributor integral to the rotating parts of the machine.

The exemplary machine shown in FIGS. 3 and 4 belongs to this type.

In any case, the means for feeding the measured amount of washing liquid in the sieve comprises a plurality of holes or nozzles arranged on a support integral to a fixed part, or a rotating part, of the machine in hydraulic communication with a feeding duct of the washing liquid.

The efficiency of the system is such that the washing liquid supply time is only a few seconds. A valve is provided for controlling the supply of the washing liquid that can be manual or preferably automatic, such as an electrovalve with a timer. The intermittence of the delivery is adjusted responsive to the nature of the food product.

BRIEF DESCRIPTION OF THE DRAWINGS

The invention will now shown with the following description of an exemplary embodiment thereof, exemplifying but not limitative, with reference to the attached drawings wherein.

DESCRIPTION OF A PREFERRED EXEMPLARY EMBODIMENT

Figure 1:
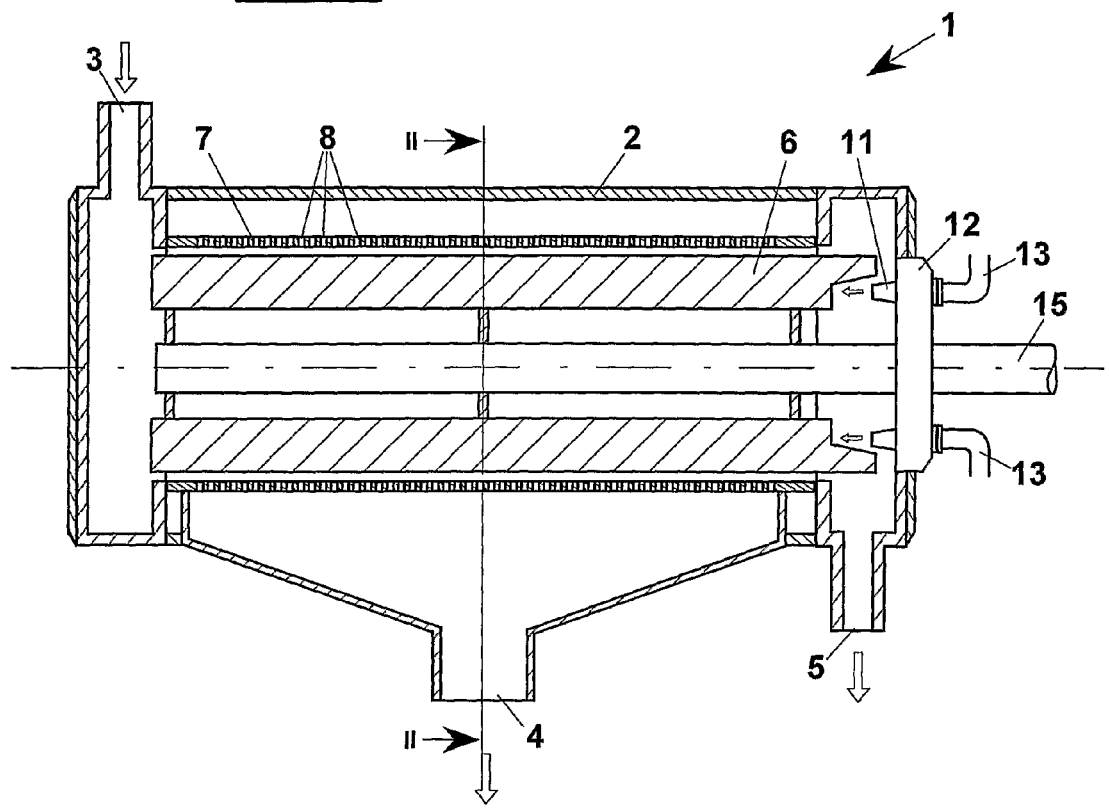
FIG. 1 shows a longitudinal sectional view of a possible exemplary embodiment of a machine used in plants for making puree or juice from vegetable or animal food, according to the invention.

With reference to FIG. 1, a machine 1 according to the invention used in plants for making puree or fruit juice, starting from vegetable or animal food, such as a rough or a fine extractor, comprises essentially a cylindrical body 2 having an inlet 3 for a product to treat, an outlet 4 for a part of product that can be used and an outlet 5 for the other part of product to dispose of. The product put in the cylindrical body 2 of the machine 1 is pushed by centrifugal force by a plurality of planar blades of a rotor 6 and is caused to pass through a sieve 7 having holes 8 and having a cylindrical or conic shape. A motor not shown in the figures wheels the armature 6 through a shaft 15.

According to the invention, the machine 1 has a plurality of holes or nozzles 11 suitable for supplying in the sieve 7 a flow of washing liquid, for example water or diluted juice, in longitudinal direction (FIGS. 1 and 2), or radial direction (FIGS. 3 and 4), with respect to the machine 1, so that the blades of the armature in quick rotation entrains the washing liquid and force it against the inner surface of the sieve.

Figure 2:
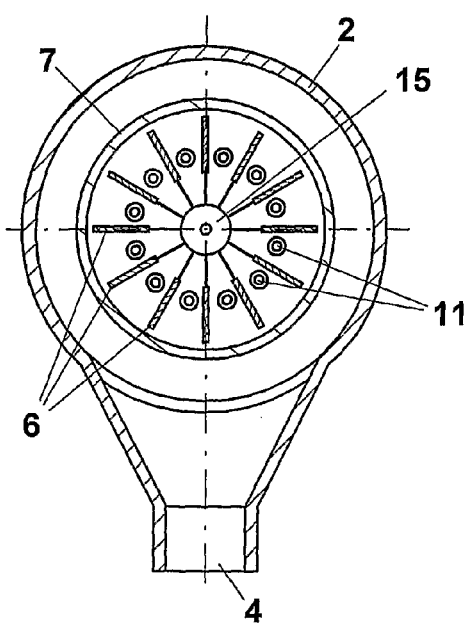
FIG. 2 shows a cross sectional view of the machine according to arrows II-II of FIG. 1.

In the exemplary embodiment of FIGS. 1 and 2 the nozzles 11 are arranged on a collector 12 integral to the cylindrical fixed body 2 of the machine 1 and in hydraulic connection with a feeding system of the washing liquid by a duct 13 (FIG. 2).

Figure 3:
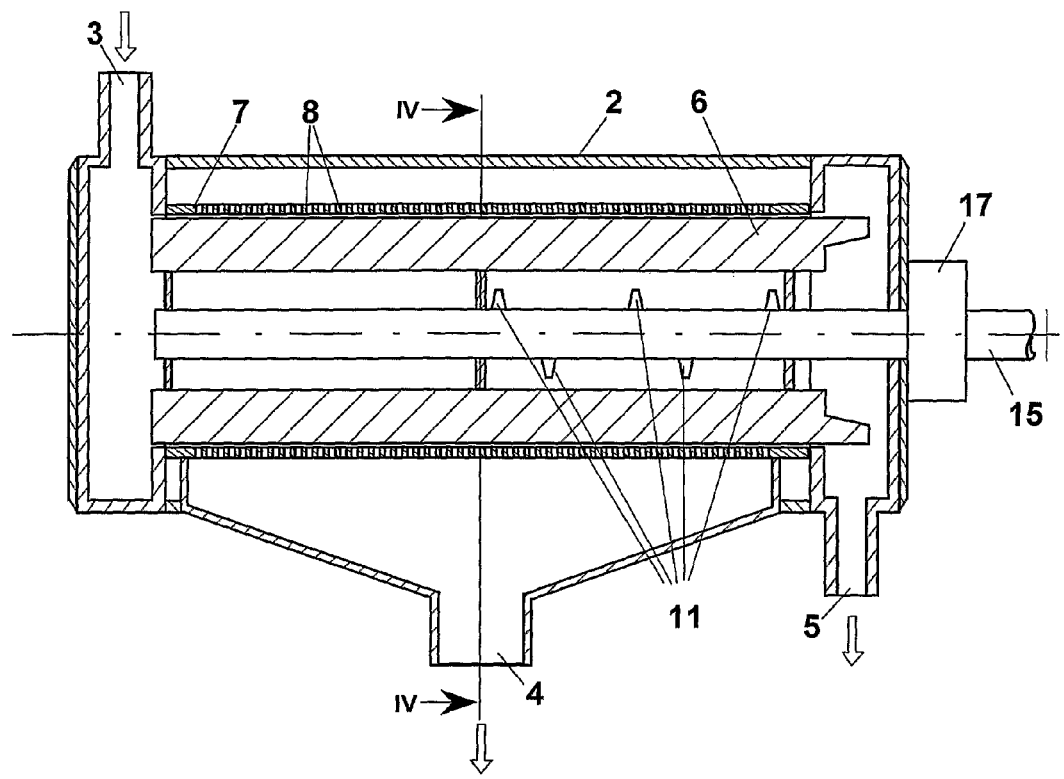
FIG. 3 shows a longitudinal sectional view of an alternative exemplary embodiment of the machine of FIG. 1.
Figure 4:
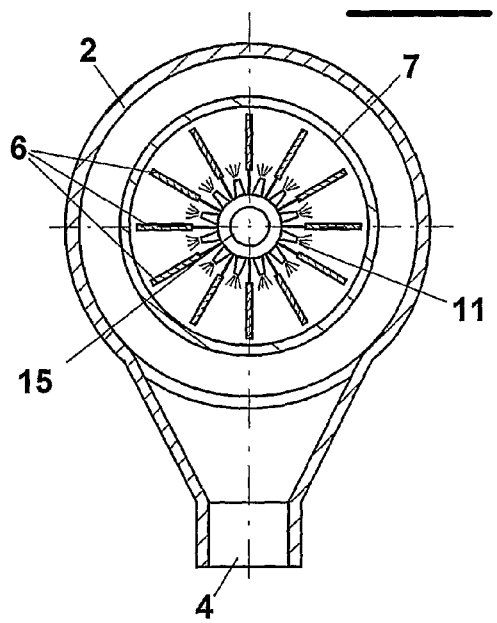
FIG. 4 shows a cross sectional view of the machine according to arrows IV-IV of FIG. 3.

In the exemplary embodiment shown in FIGS. 3 and 4, the nozzles 11 are arranged along a portion of the hollow shaft mounted coaxially to the machine 1 and are in hydraulic communication with a feeding system of the washing liquid through a rotating joint 17. In particular, the nozzles 11 are mounted on the hollow shaft with their axis orthogonal to it in order to supply a jet of washing liquid radially against the cylindrical body 2 of the machine 1. The shaft that wheels the armature 15 is fitted in this case on the hollow shaft.

This way, the washing liquid put into the sieve by holes 11 is pushed through the sieve, by the centrifugal force of the armature of the machine, and then through the layer of puree stuck to the external surface of the sieve, causing its disengagement from the sieve. Therefore, the supplied washing liquid reduces the grip between the external surface of the sieve and the layer of puree, assisting its disengagement and its entrainment by the flowing temporarily diluted puree and avoiding then any obstruction of the holes of the sieve. In particular, the supplied washing liquid infiltrates between the external surface of the sieve and the layer of puree causing it to drop and avoiding any obstruction of the holes of the sieve. Furthermore, a recurrent supply of washing liquid can be made, variable according to the type of food used for the puree and to the operative conditions of the machine, for example every 15 or 30 minutes, or even more frequently, avoiding the formation of thick layers of deposits on the sieve, but only thin layers that can be quickly washed away by the washing liquid.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. Method for extracting puree or juice from vegetable or animal food, said method comprising the steps of:
   providing a sieve having a plurality of holes and defining an interior portion and an exterior portion;
   providing a rotor disposed longitudinally within the sieve, the rotor comprising a plurality of planar blades extending longitudinally and radially therefrom;
   feeding said food within said sieve and causing the rotor to rotate, the rotation of the rotor causing the food that is present in the sieve to be pushed by centrifugal force through the holes of the sieve during an extraction operation; and
   providing an inlet for the food in communication with the interior portion;
   providing an outlet for extracted puree or juice in communication with the exterior portion;
   providing an outlet for waste product in communication with the interior portion, separate from the inlet;
   providing a washing step of the sieve during the extraction operation, the washing step of the sieve consisting of feeding a diluting liquid in the interior portion of the sieve and longitudinally to the sieve, the diluting liquid forming a locally diluted puree or juice that is pushed, by the centrifugal force produced by the blades of the rotor, from the interior portion to the exterior portion of the sieve, in such a way to prevent that any food can obstruct the holes of the sieve;
   wherein the diluting liquid is supplied by at least a feeding member integral to a fixed part of the machine and oriented longitudinally to the sieve, the feeding member being positioned at the end of the sieve that is opposite to the inlet, the feeding member feeding the diluting liquid for a predetermined time and at predetermined intervals.

2. Method according to claim 1, wherein said feeding step is provided by a feeding means that introduces the diluting liquid in through a distributor element integral to a fixed part of the machine, said distributor element comprising nozzles oriented longitudinally to the machine.

3. Method according to claim 1, wherein the food inlet is provided at a first end of the sieve, and the feeding step is provided by a plurality of nozzles disposed in each of said extraction volumes at an opposite end of the sieve, directing washing liquid in a longitudinal direction with respect to the sieve.

4. Method according to claim 1, wherein said feeding step is provided by a feeding means that introduces the washing liquid in each of said extraction volumes through feeding elements integral to a rotating part of the machine.

5. Method according to claim 4, wherein the feeding step is provided by a feeding means that comprises a plurality of nozzles disposed in the rotor, directing washing liquid radially with respect to the sieve.

6. Method according to claim 1, further comprising supplying the washing liquid to the feeding means for a predetermined time and at predetermined intervals, the supplying being carried out according to a program responsive to the food subject to the extraction operation.

7. Method according to claim 1, wherein the sieve is generally tubular in shape.

8. Method according to claim 1, additionally comprising providing an exterior casing, with the portion exterior to the sieve being disposed between the sieve and the exterior casing.

\* \* \* \* \*